United States Patent [19]

Booher

[11] Patent Number: 5,462,620
[45] Date of Patent: * Oct. 31, 1995

[54] CONTINUOUS PULTRUSION METHOD OF MAKING FRICTION UNITS

[75] Inventor: Benjamin V. Booher, Scottsdale, Ariz.

[73] Assignee: Universal Design, Scottsdale, Ariz.

[*] Notice: The portion of the term of this patent subsequent to Oct. 20, 2009, has been disclaimed.

[21] Appl. No.: 255,081

[22] Filed: Jun. 7, 1994

Related U.S. Application Data

[60] Division of Ser. No. 32,269, May 24, 1993, abandoned, which is a continuation-in-part of Ser. No. 647,137, Jan. 29, 1991, Pat. No. 5,156,787.

[51] Int. Cl.$^6$ .................................................. B29C 70/52
[52] U.S. Cl. ................... 156/180; 188/251 A; 264/137; 264/145
[58] Field of Search ....................... 156/180, 181, 156/269, 250; 188/251 A, 251 R; 264/135, 136, 137, 145, 156

[56] References Cited

U.S. PATENT DOCUMENTS

| T941,012 | 12/1975 | Marzocchi | 188/251 A |
|---|---|---|---|
| 2,158,337 | 5/1939 | Rasmussen | 188/250 A |
| 3,520,390 | 7/1970 | Bentz | 188/251 A |
| 3,657,040 | 4/1972 | Shobert | 156/178 |
| 3,714,319 | 1/1973 | Kwolek | 264/236 |
| 3,759,353 | 9/1973 | Marin | 188/251 A |
| 3,956,545 | 5/1976 | Afflerbach et al. | 428/37 |
| 3,967,037 | 6/1976 | Marzocchi et al. | 428/392 |
| 4,119,591 | 10/1978 | Aldrich | 188/251 A |
| 4,244,994 | 1/1981 | Trainor et al. | 428/37 |
| 4,259,397 | 3/1981 | Saito et al. | 428/388 |
| 4,364,997 | 12/1982 | Yamamoto et al. | 188/251 A |
| 4,432,922 | 2/1984 | Kaufman et al. | 264/119 |
| 4,445,957 | 5/1984 | Harvey | 156/180 |
| 4,563,386 | 1/1986 | Schwartz | 428/283 |
| 4,728,552 | 3/1988 | Jensen, Jr. | 188/251 A |
| 4,785,029 | 11/1988 | Honma et al. | 523/153 |
| 4,821,400 | 4/1989 | Burkhart, III et al. | 29/527.4 |
| 4,842,667 | 6/1989 | Thorsted, Jr. | 156/166 |
| 4,883,552 | 11/1989 | O'Connor et al. | 156/180 |
| 4,892,600 | 1/1990 | Beever | 156/166 |
| 4,944,373 | 7/1990 | Ohya et al. | 188/251 A |
| 5,026,447 | 6/1991 | O'Conner | 156/166 |

OTHER PUBLICATIONS

ATex Knitted Matrix Fabrics, by Advanced Textiles, Inc. (No Advanced Textiles Inc., Company Brochure (No date).

*Primary Examiner*—Robert B. Davis
*Attorney, Agent, or Firm*—Maxham, Jester & Meador Baker

[57] ABSTRACT

A continuous process for the manufacture of friction units includes the steps of impregnating a plurality of strands of reinforcing fibers with a phenolic resin having zero to ten percent copper and graphite powders, pulling the impregnated strands of reinforcing fibers through a composite forming die for forming a body having the peripheral configuration of the friction units, and selectively cutting the body into a plurality of the friction units.

19 Claims, 1 Drawing Sheet

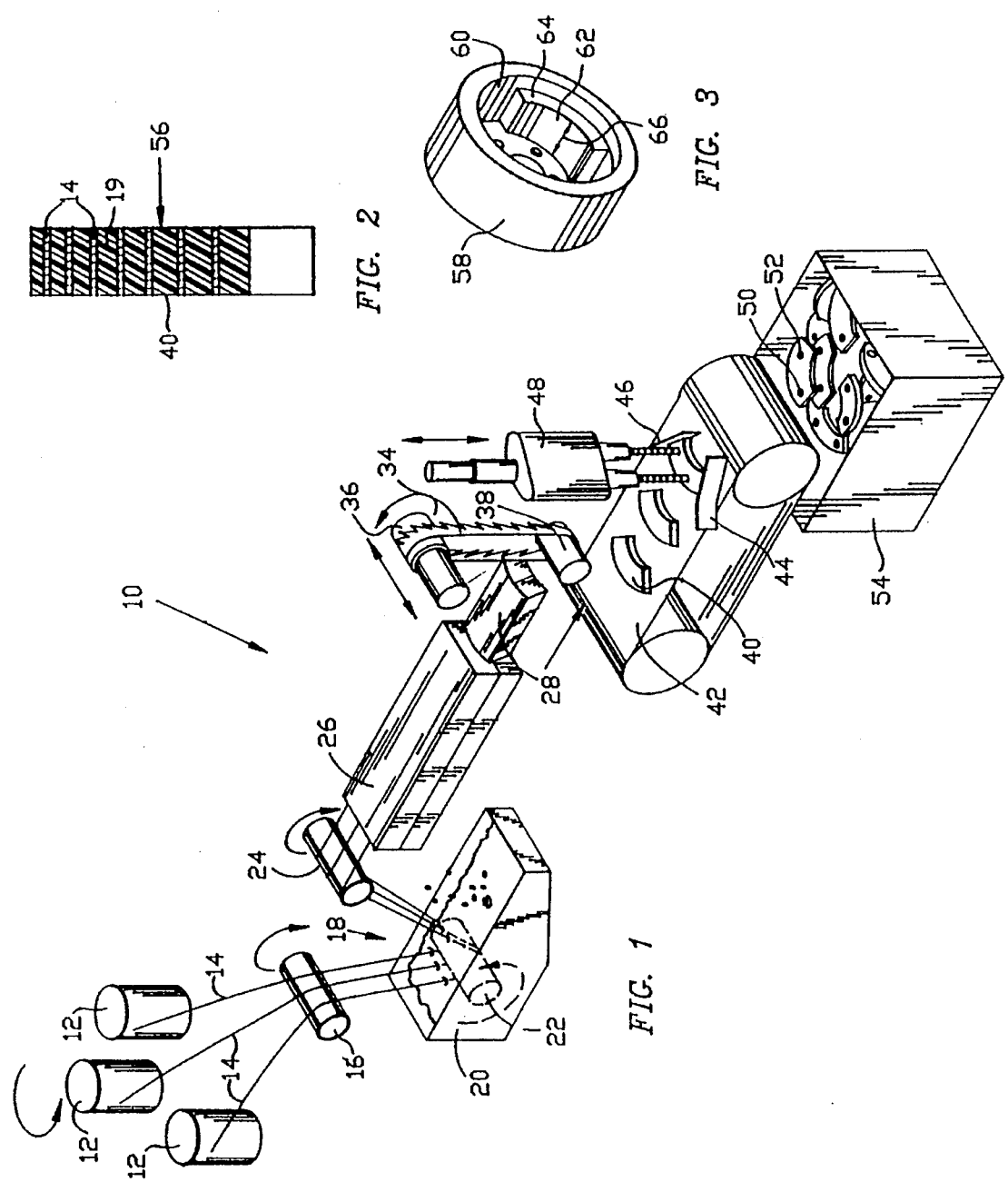

1

CONTINUOUS PULTRUSION METHOD OF MAKING FRICTION UNITS

REFERENCE TO RELATED APPLICATION

This application is a division of application Ser. No. 08/032,269, filed May 24, 1993, now abandoned which is a continuation-in-part of application Ser. No. 07/647,137, filed Jan. 29, 1991, now U.S. Pat. No. 5,156,787 entitled "PULTRUSION METHOD OF MAKING BRAKE LININGS".

BACKGROUND OF THE INVENTION

The present invention relates to composition friction elements and pertains particularly to an improved method and composition for making same.

A friction brake is basically a pair of friction elements, one rotating and one stationary, brought into engagement to produce a friction force measured as brake torque for either slowing or stopping the rotating element. Brakes are designed so that the brake torque is somewhat proportional to the input force used to engage the elements. Unfortunately, pressure is not the only factor that influences the frictional response of the brake elements. Friction effects between friction elements cause friction force and brake torque to vary with engaging pressure, speed, and temperature, and to depend upon deposited interfacial film for stability.

The rotating element of a brake system is usually a steel disc or drum, and the stationary element is usually a composition pad or shoe lining. The materials forming the composition element are the unpredictable variables that have the greatest affect on the performance characteristics of the brake system. Desirable materials for the composition element must have good friction, wear and heat resistant characteristics. This includes good fade resistance, or the ability to maintain good braking with heat buildup.

Until recent years, the predominant material used in the manufacture of friction pads and discs for brakes, clutches and the like was asbestos. These were manufactured by a molding process where each unit was formed in a mold cavity. The predominant material was asbestos fibers and a binder, and molding was a satisfactory method of manufacturer. However, it was discovered that asbestos is a carcinogenic substance, and that such use released potentially harmful amounts of it into the environment. For this reason, some industrialized countries prohibit the use of asbestos friction materials, and others including the United States require the use of asbestos to be phased out over the next few years. Therefore, there exists an urgent need for safe and effective friction materials and economical methods of manufacturing the materials into suitable friction units.

Extensive efforts have been put forth in recent years in an effort to find suitable environmentally safe materials and compositions having the desirable wear, heat and other characteristics to serve as a substitute for asbestos. These efforts have been frustrated by the many and varied parameters involved, including the range of needs to be met. For example, different size vehicles require different size friction pads and often have other variables including higher operating forces and temperatures.

Attempts to satisfy the need for long life, high friction heat resistant friction materials have included proposals to utilize various chopped fibers molded in a bonding matrix, such as a resin. The friction unit is formed in the traditional fashion by a molding process, with the fibers randomly oriented and placed in a binder, such as either a dry powder resin cured under heat and pressure, or placed in a liquid resin in a mold and cured. Examples of these compositions and manufacturing methods are disclosed in U.S. Pat. Nos. 4,119,591, granted Oct. 10, 1978 to Aldrich, 4,259,397, granted Mar. 31, 1981 to Saito et al, and 4,432,922, granted Feb. 21, 1984 to Kaufman et al.

However, friction units made by this method are expensive to manufacture and have not been satisfactory, because of their lack of uniformity in performance and durability. For example, units from the same batch may vary as much as 35% in performance characteristics. Thus, seemingly identical brake pads or shoes may vary as much as 35% in performance. The non-uniformity of results has been found to be caused largely by a non-uniformity of distribution and orientation of the fibers in the matrix. This not only creates expensive inspection and quality control problems, it can also create maintenance problems, and sometimes even hazardous conditions. For example, pads that have been matched for performance at initial installation may vary over their useful life.

In my aforementioned parent application, I disclosed an improved composition and method of manufacture for brake pads and linings. However, further improvements in both compositions and methods of manufacture are desirable and have been developed as set forth herein.

SUMMARY AND OBJECTS OF THE INVENTION

It is the primary object of the present invention to provide improved methods of manufacturing and compositions for brake frictions linings.

Another object of the present invention is to provide improved method of applying a pultrusion process to the manufacture of friction elements.

Another object of the present invention is to provide improved compositions useful for friction units and for applying a pultrusion process to the manufacture of friction elements.

In accordance with a primary aspect of the present invention, friction units are manufactured by a pultrusion process and comprise a composition of a somewhat controlled density and orientation of an array of fibers in a phenolic resin with selected minor quantities of one or more of various mineral and/or metal powders.

Another aspect of the invention includes friction units made by a continuous process comprising the steps of selecting and wetting a uniform array of strands of reinforcing fibers with a liquid phenolic resin material, pulling the impregnated strands of reinforcing fibers through a composite forming die for forming a body having at least a portion of the peripheral configuration of the friction units, and selectively cutting the body into a plurality of the friction units.

In accordance with further aspect of the invention, an array of strands of reinforcing fibers are selectively oriented in molds and molded with compositions of phenolic resins.

BRIEF DESCRIPTION OF THE DRAWING

The above and other objects and advantages of the present invention will become apparent from the following description when read in conjunction with the accompanying drawings wherein:

FIG. 1 is a perspective view schematically illustrating an apparatus and a preferred method of carrying out the invention;

FIG. 2 is a detailed sectional view of a brake pad in accordance with the invention; and FIG. 3 is a perspective view of a brake shoe lining in a drum type brake in accordance with the invention.

DETAILED DESCRIPTION OF A PREFERRED EMBODIMENT

Referring to FIG. 1 of the drawing, there is schematically illustrated an exemplary system for carrying out the process of the invention for making brake friction units in accordance with the invention. The system, designated generally by the numeral 10, comprises a plurality of creels 12 from which a plurality of strands 14 of an elongated continuous fiber or arrays of fiber are drawn and passed across suitable guide rollers or bars 16 to and through an impregnating or wetting bath 18 of a resin. The fibers may be in the form of individual strands, woven fabrics, matting, or stitched fabrics or combinations of them. The fibers or strands 16 pass into or through a bath of a suitable liquid resin contained within a reservoir 20 for wetting or impregnating the fibers or strands. The fibers 14 are guided beneath suitable guide roller or means 22 and over the guide roller 24 and into a die 26 for imparting at least a part of the final shape or configuration of the friction units.

The strands, particularly if glass fibers, may require a sizing treatment, i.e. application of a compound or chemical to insure a good or complete wetting of the fibers and a good bond between the fibers and matrix. A bulked roving (bunch of strands or fibers) is preferably used. Bulked roving is produced by a process in which a standard roving is fractured or splintered by forced cold air. This provides two useful properties, 1) increased diameter which assists in providing fill to low glass content pultrusion, and 2) the "splinters" provide for good mechanical bonding with the resin matrix. The bulked roving can be carried out by means of one or more cold air jets directed onto the roving (bunch of strands) before it goes into the resin bath 18.

The resin wetted strands are passed through the die 26, where they are shaped into part of the desired configuration and at least partially cured. They emerge from the die in the form of an elongated continuous bar or block 28 having at least part of the peripheral configuration of the brake pad or other article being manufactured. The bar or block 28 is forced or pulled from the die 26 by suitable means, such as rollers or the like, and positioned to be cut into individual friction or brake pad units or pieces in the illustrated embodiment. The resin partially cures before emerging from the die, thereby maintaining the strands in tension in the final product. The pultrusion process provides a substantially controlled or predetermined distribution and orientation of fibers throughout the body of the friction unit.

In the illustrated embodiment, a suitable cutting apparatus, such as a band saw 34 supported on its pulleys or rollers 36 and 38, is movable transverse to the axis or movement of the bar 28 for sawing the bar into a plurality of brake pads 40. Other suitable cutting apparatus may be utilized, such as water jets, laser, abrasive or other means. The cut surface represents the friction surface in this embodiment, and the fibers are preferably substantially normal or perpendicular to this surface. It may be desirable in some instances to provide a different angularity to the fibers in relation to the friction surface. This can be accomplished by cutting the friction units from the bar at the desired angle to the axis thereof.

The brake pads, upon being cut from the bar, fall onto a conveyer belt 42 and are moved into position held by a jig or fixture 44, 46 for operation of a punch or drill press 48 for forming mounting holes 50 and 52 in the brake pads for attachment to a backing plate. The pads or linings may be adhesively bonded to a backing plate, in which case the holes may be eliminated. The pads are then accumulated in a suitable storage container or bin 54, where they are then packaged and shipped. This provides a highly efficient and economical manufacturing process.

The reinforcing fibers 14 for the brake pads or linings are preferably glass fiber, but may contain other materials and fibers or combinations thereof. In addition, other fibers may be woven or distributed in with the glass fibers in various selected distributions and proportions. For example, various fibers may be distributed in various concentrations substantially uniformly throughout the unit for optimizing various parameters such as inner laminar shear strength, wear, fade, and cooling.

Many different fibers or strands and combinations may be utilized, including but not limited to glass, rock wool, ceramic, carbon, graphite, aramid, nomex, wool and cotton fibers of other organic and inorganic materials. Various metallic fibers, such as copper and aluminum, may also be utilized in various proportions with non-metallic fibers. In one preferred composition, the fibers are about 20% by weight of wool or cotton fibers applied in a second stage wetting process to extend transverse to the remaining fibers.

The manufacturing system and process, as illustrated, provides for the controlled predetermined orientation of the fibers, as well as the controlled predetermined uniformity and density of the fibers within the resin matrix. For example, the composition of the friction device determines many of its characteristics, such as its durability, heat resistance, and friction resistance. With this process, the fibers may be controllably oriented uniformly at any suitable angle to the friction surface of the brake pad or friction device. Thus, the process and materials have the capability of providing superior, predictable and consistent performance.

In one form of the process, chopped wool or cotton fibers are introduced into the matrix material and are picked up by the elongated continuous strands of fibers. In this process, two reservoirs of resin are used. A first tank contains a low viscosity resin to enhance the wetting of the fibers (preferably predominately glass fibers) as they are passed through. The fibers then pass through a second tank of higher viscosity resin containing many of the fillers and chopped wool or cotton fibers. The wool or cotton fibers may make up about 20% of the fibers. They will be picked up by the primary strands of fibers and will generally extend transverse to the primary fibers. Other fibers may also be used in this way.

The matrix material may be any suitable resin that is either a thermoplastic material or non-thermoplastic material, and it may require various forms of curing. It may be cured for example by cooling, heating, or by the use of UV or other radiation or the like. However, the materials must be capable of enabling the forming of the units by the pultrusion process.

I have found a preferred material to be certain phenolic resins which are not thermoplastic. These have been found to have many desired characteristics for this manufacturing process and application. For example, one preferred phenolic resin is available from BP Chemicals under the trademark CELLOBOND and product designation J2041L. It is described as a high viscosity phenolic for use in heat cured pultrusion and press molding. It does not require any catalyst and will provide reasonably fast line speeds and cure cycles. This provides enhanced efficiency in production. In some cases, the manufactured unit must be post cured to assure the best performance. For example, it may be baked at about 500 degrees Fahrenheit for one or more hours. Preheating may also be required for larger cross sectional units. This may be taken care of in any suitable manner and usually requires low temperature from about 80 to 150 degrees Fahrenheit.

The matrix material will be formulated to include heat dissipation and/or friction modifiers, such as graphite and/or non-ferrous metallic powders. For example, from about one to ten percent by weight of one or more fillers and/or modifiers, such as graphite powder and/or one or more non-ferrous metallic powders, may be incorporated into the matrix material. Other materials include but are not limited to mineral filler, rubber powder, copper powder, ceramic powder and cashew nut shell flower. These may each be in the amount of one percent (1%) to ten percent (10%) and preferably in the amount of 3% to 5% by weight. Cashew nut flower has been found to enhance the fade characteristics of pads or linings. During braking, heat breaks down the nut shell flower causing nut shell oil to combine chemically with the resin polymer molecule in a process known as chain branching. Thereby, the polymer becomes stronger and more able to withstand high temperatures that contribute to brake fade. The ceramic powder is preferably in the form of hollow spheres of about seven to ten microns. These have been found to serve as a lubricant in the pultrusion process and to enhance the hardness and wearability of the friction units.

The fiber to resin matrix may vary from about one part fiber to two part resin, up to about three part fiber to one part resin. A preferred fiber to matrix composition is from about 60% to 70% fiber to 30% to 40% resin or matrix mix. The matrix preferably has from 5% to 10% by weight of one or more of graphite powder, copper powder, aluminum powder and the aforementioned powders. In addition, aramid pulp and other synthetic fiber pulps may be added or distributed throughout the matrix material.

Certain thermoplastic materials may be desirable for other specific applications. The thermoplastic material may, for example, be a suitable polyester and may also have components such as powders of graphite or other material to aid in friction control and the dissipation of heat. For example, a one to about ten percent by weight of graphite powder uniformly distributed through the thermoplastic material aids in the dissipation of heat. Alternate compositions may include small amounts of other materials, such as non-ferrous metallic powders, such as copper, aluminum or the like. For example, a one to ten percent by weight copper powder may also be utilized to enhance the dissipation of heat. Thus, the composition must be compatible with the pultrusion process and at the same time provide satisfactory friction units.

I have discovered that various proportions and compositions of materials can affect the pultrusion process as well as the performance characteristics of the brake pad and liner units. For example, the following ranges of examples have been constructed and tested:

Glass fiber content about 37 to 51% by volume (about 55 to 68% by weight), with a matrix of resin containing about 5 to 10% by weight of fine graphite and copper powder.

The best results were obtained from compositions within the range of from about 58 to about 59% by weight (41% volume) glass fiber in a matrix of phenolic resin, with about 5 to 10% by weight copper, and 5 to 10% by weight graphite. These samples more closely followed the temperature performance of asbestos control samples.

More recent tests have confirmed that the pultrusion process in accordance with the subject invention can produce effective and economical friction units. Units produced in accordance with the invention have shown good and substantially stable coefficient of friction from 0.25 to 0.50 over temperature ranges of 150 to 700 degrees Fahrenheit with pad pressures from 50 to 200 psi.

Referring to FIG. 2, a section view through a brake pad 40 is illustrating glass fibers 14 in a matrix of thermoplastic material 19. The fibers 14 are shown substantially perpendicular to a friction surface 56 of the brake pad 40. Other friction devices, such as brake shoes and clutch pads, would preferably have similarly oriented strands or fibers. The density and mixture of fibers may be varied to suit the particular application.

While brake pads are illustrated in the process, it is apparent that clutch friction pads and brake shoe type of pads or linings may also be manufactured by this process. The die is set to shape one peripheral outline of the emerging articles. In the case of pads for disc rotors, the fibers are oriented uniformly at an angle preferably normal to the friction surface for the highest efficiency of manufacture. However, in certain applications, an orientation parallel to the friction surface may be satisfactory or even preferred for manufacturing as well as performance. For example, in a brake shoe and drum configuration as illustrated in FIG. 3, the fibers may preferably run parallel to the friction surface for ease of manufacturing. This orientation is preferred where inner laminate shear strength is a factor. As illustrated, a typical brake drum 58 is illustrated having an inner friction surface 60 engaged by a brake shoe lining 62. The lining 62 is formed of fibers, the ends of which are shown at 64, with the fibers oriented substantially parallel to the friction surfaces as indicated along arrow 66. This orientation of the fibers provides for an economical construction of brake friction units in a pultrusion process. Thin curved pultruded bars or slabs can be cut as in the FIG. 1 illustration to form the liner units.

The shoe linings may be formed by the pultrusion process in the form of a thin arcuate slab, and the linings cut to width as described above with respect to pads. This provides an economical technique for producing consistently uniform units. However, where orientation of the fibers normal to the friction is desired, a rectangular slab may be cut along an arc to form the curved friction surfaces.

The articles may be cut from the pultruded bar by any suitable means, such as by laser, water or other means. The present method and process provides a highly efficient manufacturing process for the production of high quality friction units that are asbestos free and/or a controlled uniform composition and quality. The pultrusion process enables the careful control of fiber density, mixture, and orientation on a continuous basis.

While the pultrusion process is preferred, the articles may also be made by a filament winding process. By this process, strands or filaments are wound on or into compression mold cavities supported on a drum or circular rim, forming slabs which can then be cut into the friction units.

While I have illustrated and described my invention by means of specific embodiments, it should be understood that numerous changes and modifications may be made therein without departing from the spirit and scope of the invention,

I claim:

1. A continuous process for the manufacture of friction units comprising the steps of:
    selecting a substantially uniform array of strands of reinforcing fibers;
    wetting said array of strands of reinforcing fibers with a resin material;
    pulling said wetted strands of reinforcing fibers in a predetermined density and orientation through a composite forming die for forming a body having a peripheral configuration of said friction units;
    solidifying said body by curing said resin; and
    selectively cutting said body transverse to said strands into a plurality of said friction units, thereby forming a plurality of friction units having a predetermined distribution and orientation of fibers.

2. A continuous process according to claim 1 wherein said array of reinforcing fibers are bulked roving of predominately glass fibers.

3. A continuous process according to claim 2 wherein said resin material is a phenolic resin.

4. A continuous process according to claim 3 wherein the ratio of fibers to resin is from about forty to sixty percent by weight.

5. A continuous process according to claim 4 wherein said reinforcing fibers are uniformly oriented predominately at a right angle with respect to the friction surface.

6. A continuous process according to claim 5 wherein said resin material is a phenolic resin having about from about three to ten percent by weight of powder selected from the group consisting of rubber, copper, graphite, ceramic, and cashew nut.

7. A continuous process according to claim 1 wherein said resin material is a phenolic resin having about one to ten percent by weight of powder selected from the group consisting of rubber, copper, graphite, ceramic, and cashew nut.

8. A continuous process according to claim 1 wherein said friction unit is a brake pad having a friction surface wherein said fibers extend substantially normal to said surface.

9. A continuous process according to claim 1 wherein said friction unit is a brake shoe lining having a friction surface wherein said fibers extend substantially parallel to said surface.

10. A continuous process according to claim 9 wherein said step of selecting said fibers includes selecting a fabric of said fibers.

11. A continuous manufacturing process for making composite friction units comprising the steps of:
    selecting a substantially uniform array of predominately glass strands of reinforcing fibers:
    wetting said plurality of strands of reinforcing fibers with a phenolic resin material;
    pulling said wetted strands of reinforcing fibers in a predetermined uniform distribution and orientation through a composite forming die for forming a body having a peripheral configuration of said friction unit;
    solidifying said body by curing said resin; and
    selectively cutting said body at least along one path transverse to said strands into a plurality of said friction units, thereby forming a plurality of friction units having a predetermined size and configuration and uniform distribution and alignment of fibers throughout.

12. A process according to claim 11 wherein said reinforcing fibers make up about 60 to about 70% by weight of said body and include additional fibers from the group consisting essentially of rock wool, ceramic, graphite, and aramid.

13. A process according to claim 11 wherein said resin is selected to contain one to ten percent by weight of powder taken from the group consisting of rubber, copper, aluminum, graphite, ceramic and cashew nut.

14. A process according to claim 13 wherein said resin contains about 5 to 10% by weight of graphite powder, about 5 to 10% by weight of copper powder and 3 to 5% by weight of cashew nut shell flower.

15. A process according to claim 14 wherein cutting said body forms a friction surface transverse to the fibers.

16. A process according to claim 11 wherein cutting said body forms a friction surface transverse to the fibers.

17. A continuous pultrusion manufacturing process for manufacturing composite friction units comprising the steps of:
    selecting a substantially uniform array of elongated strands of predominately glass reinforcing fibers, including additional fibers taken from the group consisting essentially of rock wool, ceramic, carbon, and aramid;
    impregnating said plurality of strands of reinforcing fibers with a phenolic resin material, said resin selected to have about three to about ten percent by weight of at least one powder selected from the group consisting of rubber, copper, graphite, ceramic, and cashew nut shell flower;
    pulling said impregnated strands of reinforcing fibers in a substantially uniform distribution and alignment through a composite forming die for forming a body having a peripheral configuration of said friction unit;
    solidifying said body by curing said resin; and
    selectively cutting said body at least along one path transverse to said strands into a plurality of said friction units, thereby forming a plurality of friction units of a predetermined size and configuration and having a substantially uniform distribution and alignment of fibers throughout.

18. A process according to claim 17 wherein
    said reinforcing fibers are selected to be from about 55 to about 75% by weight of said body; and
    said resin is selected to be about 25 to about 45% by weight of said body and contain from about 5 to 10% by weight of copper powder, about 5 to 10% by weight of graphite powder and about 3 to 5% cashew nut shell flower.

19. A process according to claim 18 wherein said reinforcing fibers are about 60 to 70% of said body.

* * * * *